(12) United States Patent
Katsumi

(10) Patent No.: US 7,773,888 B2
(45) Date of Patent: Aug. 10, 2010

(54) IMAGE FORMING APPARATUS MAINTENANCE VIA ERROR TRANSMISSION

(75) Inventor: Toru Katsumi, Toride (JP)

(73) Assignee: Canon Kabushiki Kaisha (JP)

( * ) Notice: Subject to any disclaimer, the term of this patent is extended or adjusted under 35 U.S.C. 154(b) by 308 days.

(21) Appl. No.: 11/848,888

(22) Filed: Aug. 31, 2007

(65) Prior Publication Data

US 2008/0056736 A1 Mar. 6, 2008

(30) Foreign Application Priority Data

Sep. 4, 2006 (JP) .............................. 2006-238934

(51) Int. Cl.
*G03G 15/00* (2006.01)
(52) U.S. Cl. ............................................ 399/8; 399/10
(58) Field of Classification Search ................ 399/8–11
See application file for complete search history.

(56) References Cited

U.S. PATENT DOCUMENTS

| | | | | |
|---|---|---|---|---|
| 6,577,822 | B2 * | 6/2003 | Inui et al. ..................... | 399/11 |
| 6,775,238 | B1 * | 8/2004 | Suzuki ....................... | 370/242 |
| 2002/0001475 | A1 * | 1/2002 | Kikuchi et al. .................. | 399/8 |
| 2003/0059221 | A1 * | 3/2003 | Funahashi ..................... | 399/8 |
| 2003/0088590 | A1 | 5/2003 | Ueno | |

FOREIGN PATENT DOCUMENTS

| | | | |
|---|---|---|---|
| JP | 11-136377 A | 5/1999 | |
| JP | 2000-132364 A | 5/2000 | |
| JP | 2000132364 A | * 5/2000 | |
| JP | 2002-084388 A | 3/2002 | |
| JP | 2004-343621 A | 12/2004 | |
| JP | 2006-126577 A | 5/2006 | |

OTHER PUBLICATIONS

Machine English translation of JP2000-132364.*
Partial search report issued in corresponding European patent application No. 07017161.6-2209, dated Feb. 22, 2008.
Search report issued in corresponding European application No. 07017161.6-2209, dated May 27, 2008.

* cited by examiner

*Primary Examiner*—David M Gray
*Assistant Examiner*—Billy J Lactaoen
(74) *Attorney, Agent, or Firm*—Rossi, Kimms & McDowell LLP

(57) ABSTRACT

A maintenance system for image forming apparatuses, which make it possible to acquire appropriate maintenance information even when an exceptional trouble has occurred in an image forming apparatus, to thereby reduce maintenance time and maintenance costs. When an abnormal image occurs in an image forming apparatus connected to a host computer via a network, the image forming apparatus transmits image data of the abnormal image together with supplementary information. The host computer receives the abnormal image data and the supplementary information, and adds these to a database in an HDD. When a transmission request is received from the image forming apparatus, the host computer transmits abnormal image data and supplementary information stored in the HDD to the image forming apparatus. The image forming apparatus receives the abnormal image data and the supplementary information, and displays these on a display unit.

10 Claims, 15 Drawing Sheets

FIG. 4

SUPPLEMENTARY INFORMATION
<data ****>

| MACHINE NUMBER | No. ****** | |
|---|---|---|
| DATE | 200*..  | |
| ABNORMAL IMAGE | VERTICAL STREAKS | |
| COMMENT | WHITE VOID VERTICAL STREAKS POSITION AND WIDTH ARE RANDOM | |
| STATE DATA | PRINTED SHEET COUNT | MONOCHROME PRINT SHEET COUNT COLOR PRINT SHEET COUNT |
| | JOB DATA | MONOCHROME MODE/COLOR MODE |
| | | SINGLE-SIDED/DOUBLE-SIDED SECOND PAGE |
| | | SHEET TYPE (THIN SHEET, PLAIN SHEET, RECYCLED SHEET, THICK SHEET, OHP) |
| | | SHEET SIZE (A3, A4, A5, B4, B5, POSTCARD, ENVELOPE) |
| | | IMAGE PATTERN (HALFTONE, SOLID, CHARACTER, LINE) |
| | SENSOR OUTPUT | MOISTURE AMOUNT |
| | | POTENTIAL |
| | | CHARGING CURRENT |
| | | LASER OUTPUT |
| | | TONER DENSITY |
| | | PATCH DENSITY |
| | | TONER REPLENISHING TIME |
| | | PRIMARY TRANSFER VOLTAGE |
| | | SECONDARY TRANSFER VOLTAGE |
| REPAIRING METHOD | REPLACE CHARGING WIRE. CLEAN THE CHARGER | |

FIG. 5A

ABNORMAL IMAGE

|  | CODE |
|---|---|
| VERTICAL STREAKS | 001 |
| HORIZONTAL STREAKS | 002 |
| WHITE VOIDS | 003 |
| SPOTS | 004 |
| NON-UNIFORM DENSITY | 005 |
| COLOR SHIFT | 006 |
| LINE SPREADING | 007 |
| OTHERS | 008 |

FIG. 5B

JOB DATA

| | | CODE |
|---|---|---|
| MONOCHROME MODE | | 101 |
| COLOR MODE | | 102 |
| SINGLE-SIDED | | 201 |
| DOUBLE-SIDED SECOND FACE | | 202 |
| SHEET TYPE | THIN SHEET | 301 |
| | PLAIN SHEET | 302 |
| | RECYCLED SHEET | 303 |
| | THICK SHEET | 304 |
| | OHP | 305 |
| SHEET SIZE | A3 | 401 |
| | A4 | 402 |
| | A5 | 403 |
| | B4 | 404 |
| | B5 | 405 |
| | POSTCARD | 406 |
| | ENVELOPE | 407 |
| IMAGE PATTERN | HALFTONE | 501 |
| | SOLID | 502 |
| | CHARACTER | 503 |
| | LINE | 504 |

FIG. 6C

[DATA INPUT]

STEP 1
PLACE UNUSED WHITE SHEET
ON ORIGINAL PLATEN,
AND PRESS OK KEY

[ OK ]   [ CANCEL ]

FIG. 6D

[DATA INPUT]

STEP 2
PLACE OUTPUT SHEET
ON ORIGINALPLATEN,
AND PRESS OK KEY

[ OK ]   [ CANCEL ]

[DATA CONTENT CONFIRMATION  data✱✱✱✱]
IMAGE(    ) SUPPLEMENTARY INFORMATION

✱✱✱✱✱
✱✱✱✱✱
✱✱✱✱✱
COMMENT BOX
(              )

| OK | CANCEL |

[DATA CONTENT CONFIRMATION  data✱✱✱✱]

REPAIRING METHOD
(                        )

| SEND | CANCEL |

FIG. 7A

[SERVICE MODE]

CHANGE ADJUSTMENT VALUE

DIAGNOSIS

SEND DATA

OK    CANCEL

FIG. 7B

[DIAGNOSIS MODE]

IMAGE

ERROR CODE

JAM

OK    CANCEL

```
[OCCURRENCE MODE  RETRIEVAL]

MONOCHROME/COLOR                         (      )
SINGLE-SIDED/DOUBLE-SIDED SECOND FACE (      )
SHEET TYPE                               (      )
SHEET SIZE                               (      )
```

[SEARCH RESULT]
　VERTICAL STREAK 1　　　SUPPLEMENTARY INFORMATION
　　　　　　　　　　　　　＊＊＊＊＊

＊＊＊＊＊
　　　　　　　　　　　　　＊＊＊＊＊
　　　　　　　　　　　　　COMMENT BOX
　　　　　　　　　　　　　＊＊＊＊＊
　　　　　　　　　　　　　REPAIRING METHOD
　　　　　　　　　　　　　＊＊＊＊＊

| PREVIOUS SAMPLE | NEXT SAMPLE | RETURN |

FIRST COLOR  SECOND COLOR

IMAGE FORMING APPARATUS MAINTENANCE VIA ERROR TRANSMISSION

BACKGROUND OF THE INVENTION

1. Field of the Invention

The present invention relates to a maintenance system for image forming apparatuses, such as electrophotographic copying machines and printers, and a maintenance method.

2. Description of the Related Art

In general, an image forming apparatus utilizing electrophotography to form monochrome or full-color images sometimes suffer from troubles, such as failure of the apparatus and abnormal images, which occur due to aging of component parts resulting from long-term service. When such a trouble occurs in an image forming apparatus of the above-mentioned type, a service person who has received information on the trouble from the customer visits the customer to investigate the cause of the trouble and carry out appropriate maintenance e.g. by replacing parts. Thus, the performance of the apparatus is maintained and managed.

Further, there has been proposed a system in which image forming apparatuses installed in a plurality of customer sites, respectively, are connected to a server or a host computer via a network such that the server or the host computer can provide necessary information for maintenance to thereby improve the convenience of the service.

For example, a system of the above-mentioned type is configured such that each image forming apparatus can acquire contents of a service manual and a method of troubleshooting as information concerning the apparatus from an external server and display the information on an operating panel or a CRT display thereof so as to facilitate service management (see e.g. Japanese Laid-Open Patent Publication (Kokai) No. 2002-84388).

Furthermore, there has been proposed a system in which image data read by an image forming apparatus is sent to a managing apparatus, and an operator of the managing apparatus views the received image data to acquire information on an abnormality of the apparatus, and make use of the information in investigating the cause of the abnormality or determining a method of coping with the trouble (see e.g. Japanese Laid-Open Patent Publication (Kokai) No. 2004-343621).

In the system disclosed in Japanese Laid-Open Patent Publication (Kokai) No. 2002-84388, it is possible to store a means for troubleshooting in association with respective predictable troubles in the external server in advance. Actually, however, an exceptional trouble can occur. In such a case, there is no means provided for troubleshooting, and hence a service person has to investigate the cause of the trouble and find out a method of coping with the trouble.

Particularly when an image forming apparatus is a new model, no service person has sufficient experience or know-how in troubleshooting the apparatus, so that a troubleshooting operation might take much time, or replacement of more parts than necessary might be carried out, resulting in an increase in maintenance costs.

On the other hand, in the system disclosed in Japanese Laid-Open Patent Publication (Kokai) No. 2004-343621, the cause of an abnormality which occurs in the image reading system of an image forming apparatus can be determined, but an abnormality which occurs in the image forming system cannot be coped with. Further, since the cause of a trouble is determined based on investigation by an operator, the operator cannot perform correct troubleshooting unless he has sufficient knowledge.

SUMMARY OF THE INVENTION

The present invention provides a maintenance system for image forming apparatuses and a maintenance method, which make it possible to acquire appropriate maintenance information even when an exceptional trouble has occurred in an image forming apparatus, to thereby reduce maintenance time and maintenance costs.

In a first aspect of the present invention, there is provided a maintenance system for a plurality of image forming apparatuses each of which forms a predetermined image on a sheet and outputs the sheet having the image formed thereon, comprising a first transmission unit configured to transmit data of a trouble in any of the image forming apparatuses together with supplementary information including maintenance information, a first reception unit configured to receive the data of the trouble and the supplementary information transmitted by the first transmission unit, a storage unit configured to store the data of the trouble and the supplementary information received by the first reception unit in a predetermined storage area, a second transmission unit configured to transmit the data of the trouble and the supplementary information stored in the predetermined storage area, when a transmission request is received, a second reception unit configured to receive the data of the trouble and the supplementary information transmitted by the second transmission unit, and a display unit configured to display the data of the trouble and the supplementary information received by the second reception unit.

With the configuration of the maintenance system according to the first aspect of the present invention, when a trouble occurs in an image forming apparatus, the image forming apparatus receives and displays a similar one of respective data items of troubles having occurred in any of a plurality of image forming apparatuses and associated supplementary information including maintenance information, which are accumulated in the predetermined storage area. Therefore, even when an exceptional trouble occurs in an image forming apparatus, it is possible to obtain appropriate maintenance information for the exceptional trouble by referring to the similar one of the data items of the troubles ever having occurred in the image forming apparatuses and the contents of the supplementary information displayed on the image forming apparatus.

This makes it possible to shorten maintenance time and reduce maintenance costs.

The maintenance system can comprise an image reading unit configured to read images, and the data of the trouble contains trouble image data generated based on image data formed by the image reading unit by reading a trouble image on a sheet output from the image forming apparatus.

A difference between the image data formed by the image reading unit by reading the trouble image on the sheet output from the image forming apparatus and image data formed by the image reading unit by reading a plain sheet identical in type to the sheet output from the image forming apparatus can be calculated as final data of the trouble image data, and the first transmission unit can transmit the final data together with the supplementary information including the maintenance information.

The maintenance system can comprise a management apparatus connected to the image forming apparatuses via a communication line, and the management apparatus can include the first reception unit, the storage unit, and the second transmission unit.

The image forming apparatus can include the first transmission unit and the second reception unit.

The image forming apparatus can transmit the transmission request for transmitting the data of the trouble and the supplementary information stored in the storage area, to the management apparatus via the first transmission unit.

The image forming apparatus can include the display unit.

The image forming apparatus can include the image reading unit.

The display unit can display an input screen for inputting the maintenance information to be transmitted by the first transmission unit.

The display unit can display a retrieval screen for retrieving required data of a trouble and supplementary information associated therewith from a plurality of data items of troubles and associated supplementary information received by the second reception unit.

The maintenance information can include an abnormal image type.

The maintenance information can include job data used when the abnormal image was output by the image forming apparatus.

The maintenance information can include a method of repairing the image forming apparatus that output an abnormal image.

The maintenance information can include information on a state in which the image forming apparatus was in when the image forming apparatus output an abnormal image.

The image forming apparatuses are of an identical model.

In a second aspect of the present invention, there is provided a method of carrying out maintenance of a plurality of image forming apparatuses each of which forms a predetermined image on a sheet and outputs the sheet having the image formed thereon, comprising a first transmitting step of transmitting data of a trouble in any of the image forming apparatuses together with supplementary information including maintenance information, a first receiving step of receiving the data of the trouble and the supplementary information transmitted in the first transmitting step, a storage step of storing the data of the trouble and the supplementary information received in the first receiving step in a predetermined storage area, a second transmitting step of transmitting the data of the trouble and the supplementary information stored in the predetermined storage area, when a transmission request is received, a second receiving step of receiving the data of the trouble and the supplementary information transmitted in the second transmitting step, and a display step of displaying the data of the trouble and the supplementary information received in the second receiving step.

The method can comprises an image reading step of reading an image, and the data of the trouble includes trouble image data generated based on image data formed in the image reading step by reading a trouble image on a sheet output from the image forming apparatus.

A difference between the image data formed in the image reading step by reading the trouble image on the sheet output from the image forming apparatus and image data formed in the image reading step by reading a plain sheet identical in type to the sheet output from the image forming apparatus can be calculated as final data of the trouble image data, and the first transmitting step includes transmitting the final data together with the supplementary information including the maintenance information.

A management apparatus connected to the image forming apparatuses via a communication line can carry out the first receiving step, the storage step, and the second transmitting step.

The image forming apparatus can carry out the first transmitting step and the second receiving step.

The image forming apparatus can transmit the transmission request for transmitting the data of the trouble and the supplementary information stored in the storage area to the management apparatus in the first transmitting step.

The image forming apparatus can carry out the display step.

The image forming apparatus can carry out the image reading step.

The display step can include displaying an input screen for inputting the maintenance information to be transmitted in the first transmitting step.

The display step can include displaying a retrieval screen for retrieving required data of a trouble and supplementary information associated therewith from a plurality of data items of troubles and associated supplementary information received in the second receiving step.

The maintenance information can contain an abnormal image type.

The maintenance information can include job data used when the abnormal image was output by the image forming apparatus.

The maintenance information can include a method of repairing the image forming apparatus that output an abnormal image.

The maintenance information can include information on a state in which the image forming apparatus was in when the image forming apparatus output an abnormal image.

The image forming apparatuses can be of an identical model.

The above and other objects, features, and advantages of the invention will become more apparent from the following detailed description taken in conjunction with the accompanying drawings.

BRIEF DESCRIPTION OF THE DRAWINGS

FIG. 4 is a view showing an example of supplementary information.

FIG. 5A is a view showing correspondence between abnormal images and code numbers.

FIG. 5B is a view showing correspondence between job data items and code numbers.

FIGS. 6A to 6F are views showing examples of respective data transmission screens.

FIGS. 7A to 7F are views showing examples of respective data transmission screens.

DETAILED DESCRIPTION OF THE PREFERRED EMBODIMENTS

The present invention will now be described in detail with reference to the drawings showing a preferred embodiment thereof.

Figure 1:
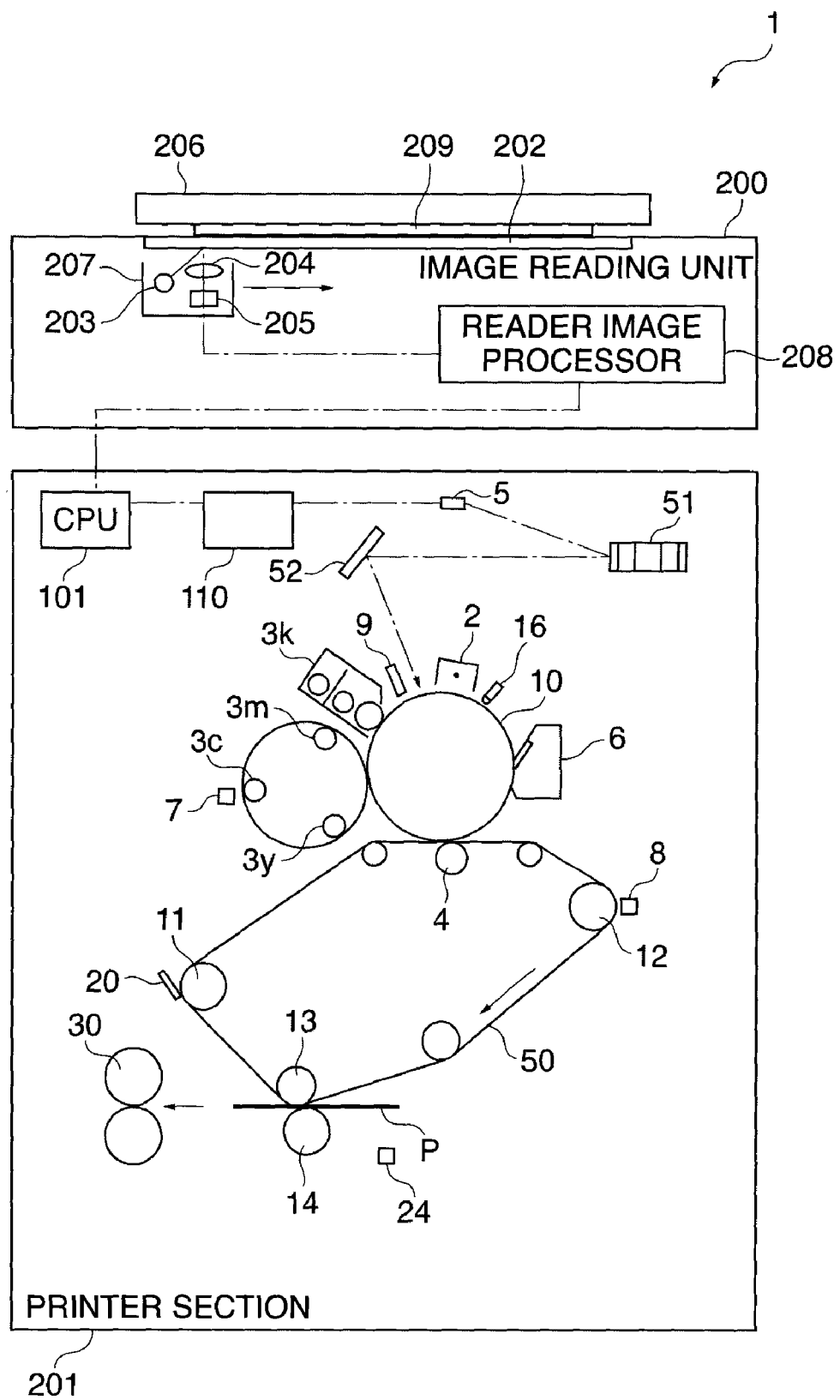
FIG. 1 is a schematic cross-sectional view useful in explaining an example of an image forming apparatus.
Figure 2:
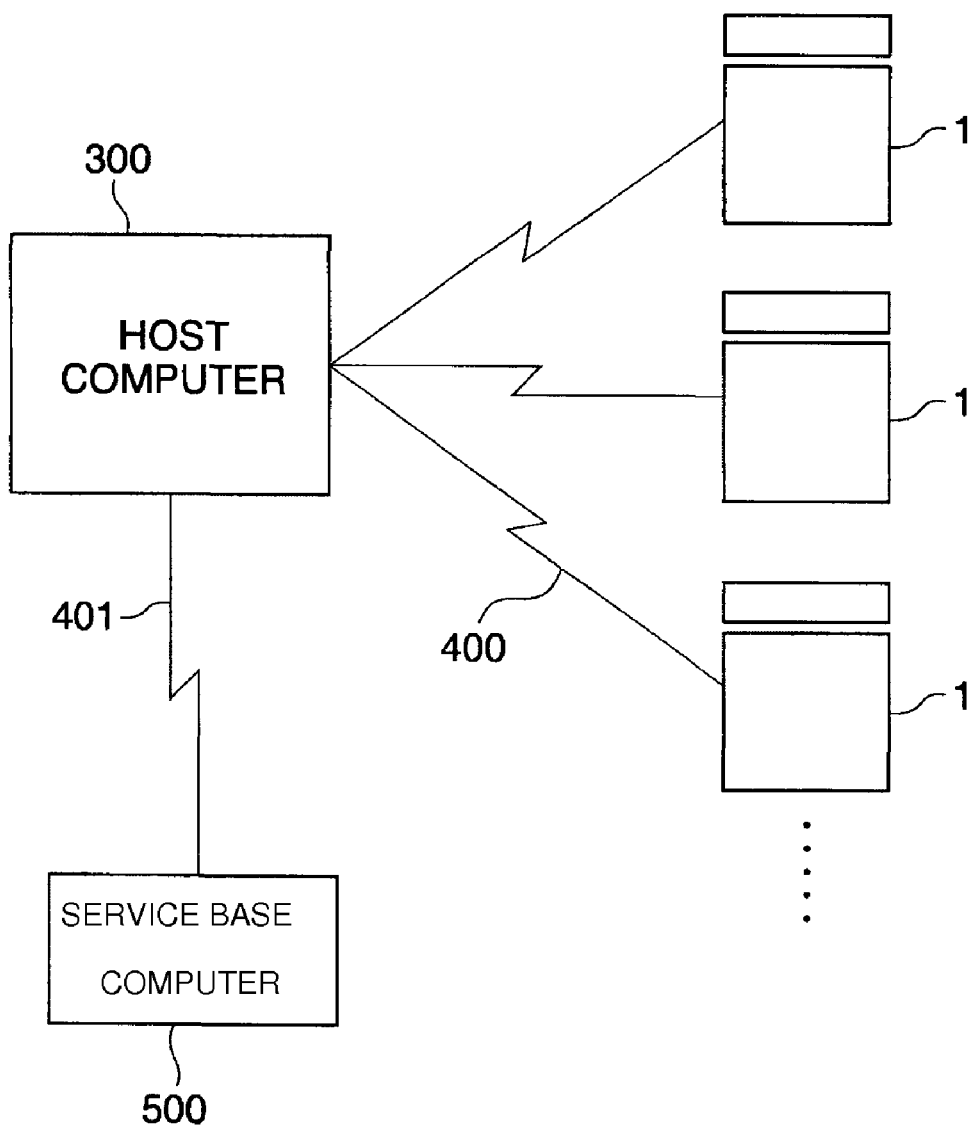
FIG. 2 is a diagram useful in explaining a maintenance system for image forming apparatuses, according to an embodiment of the present invention.
Figure 3:
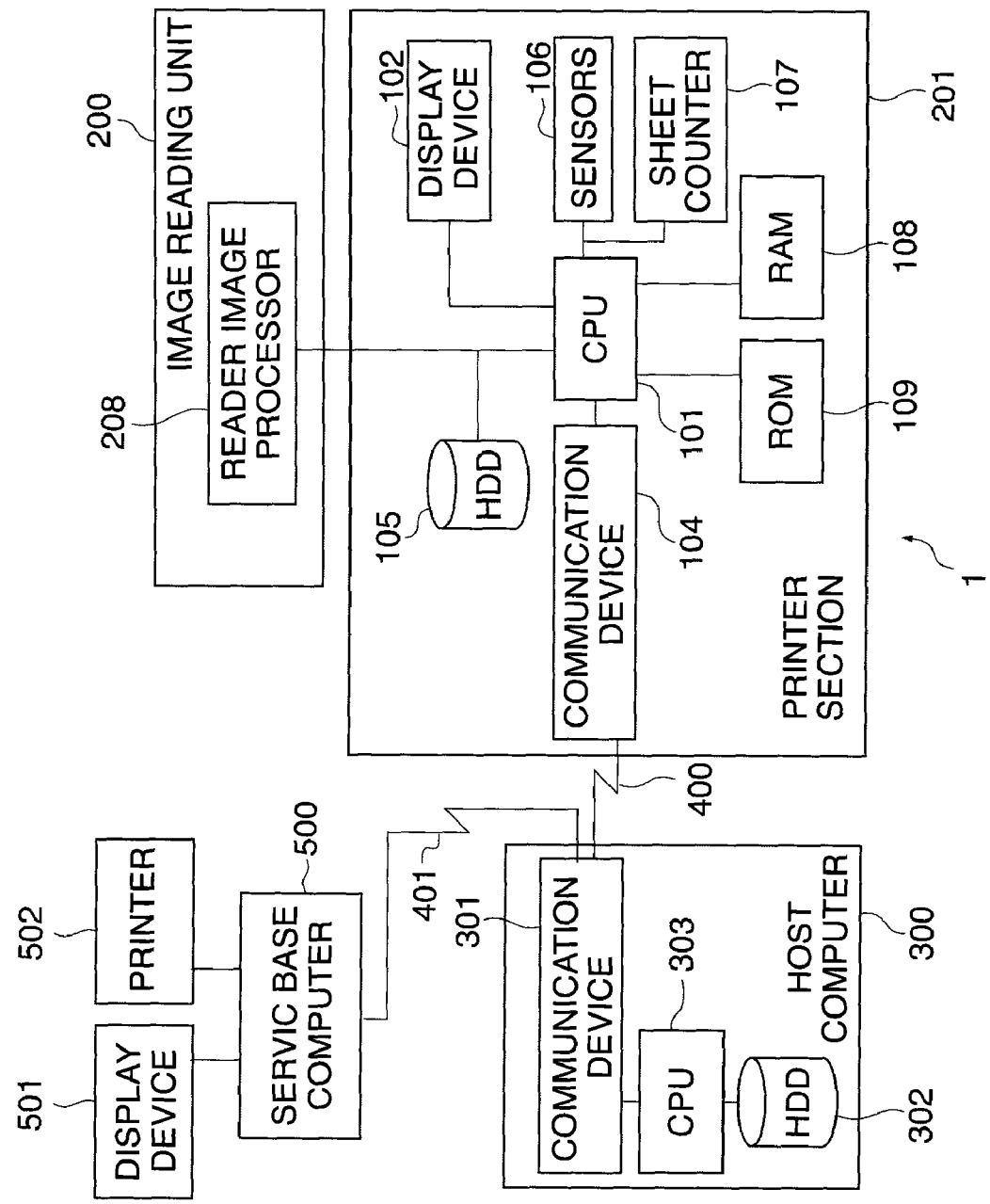
FIG. 3 is a block diagram of an image forming apparatus and a host computer.

FIG. 1 is a schematic cross-sectional view useful in explaining an example of an image forming apparatus. FIG. 2 is a diagram useful in explaining a maintenance system for image forming apparatuses, according to the embodiment of the present invention. FIG. 3 is a block diagram of an image forming apparatus and a host computer. FIG. 4 is a view showing an example of supplementary information. FIG. 5A is a view showing correspondence between abnormal images and code numbers. FIG. 5B is a view showing correspondence between job data items and code numbers. FIGS. 6A to 6F and FIGS. 7A to 7F are views showing examples of respective data transmission screens. FIGS. 8A to 13B are views showing examples of abnormal images. FIG. 14 is a conceptual view of storage data.

Referring first to FIG. 1, the image forming apparatus 1 is comprised of a printer section 201 and an image reading unit 200.

The printer section 201 includes a photosensitive drum 10 as an image bearing member rotatably supported therein, and a corona charger 2, developing devices 3y, 3m, 3c, and 3k, and a primary transfer charger 4 arranged around the photosensitive drum 10.

The developing device 3k is fixedly disposed at a location opposed to the photosensitive drum 10. The developing devices 3y, 3m, and 3c form a rotary developing unit, and sequentially move to a location opposed to the photosensitive drum 10.

The photosensitive drum 10 is driven by a drum motor, not shown, for rotation, and charged by the corona charger 2 to a predetermined potential. A laser drive circuit 110 controlled by a CPU 101 performs ON/OFF control of a laser light source 5 such that laser beams are emitted according to image data of an image to be formed.

A laser beam emitted from the laser light source 5 is irradiated onto the photosensitive drum 10 having a surface thereof uniformly charged, via a polygon mirror 51 and a mirror 52, whereby an electrostatic latent image is formed on the photosensitive drum 10.

The developing devices 3y, 3m, 3c, and 3k are filled with a predetermined amount of yellow toner, magenta toner, cyan toner, and black toner, respectively, as developers. Whenever the photosensitive drum 10 performs one rotation, the developing devices 3y, 3m, 3c, and 3k develop and visualize latent images formed on the photosensitive drum 10 in the respective colors, as yellow, magenta, cyan, and black toner images, respectively.

It should be noted that in the present embodiment, the black developer is formed of a magnetic monocomponent toner, and each of yellow, magenta, and cyan developers is implemented by a two-component developer as a mixture of toner and carrier particles. Further, a normal developing method is adopted as a developing method, in which toner reverse in polarity to the charging polarity of the photosensitive drum 10 is applied to a non-exposure part to thereby form an image.

An intermediate transfer member 50 supported by a driving roller 11, an idle roller 12, and a backup roller 13 is driven by the driving roller 11 for rotation, and at the same time, primary transfer voltage reverse in polarity to the charging polarity of the toner is applied to the primary transfer charger 4 by a high-voltage power supply, not shown. As a consequence, the yellow toner image as a first-color image formed on the photosensitive drum 10 is primarily transferred onto the intermediate transfer member 50.

Similarly, second-color, third-color, and fourth-color toner images developed on the photosensitive drum 10 are sequentially primarily transferred onto the intermediate transfer member 50, whereby the four toner images are superimposed one upon another to form a color image.

It should be noted that in the present embodiment, the primary transfer charger 4 is implemented by a conductive roller (primary transfer roller) formed by covering a metal shaft rod with an elastic layer of conductive rubber or sponge. The primary transfer charger 4 is brought into contact with the intermediate transfer member 50, and then the primary transfer voltage is applied to the shaft rod, whereby primary transfer is performed on the intermediate transfer member 50, with the primary transfer charger 4 being rotated along with the rotation of the intermediate transfer member 50.

After completion of transfer of the toner images onto the intermediate transfer member 50, toner which was not transferred onto the intermediate transfer member 50 remains on the surface of the photosensitive drum 10. The residual toner is moved along with rotation of the photosensitive drum 10 to be removed by a cleaning device 6 and collected in a toner collection container, not shown. After collection of the residual toner, residual charge remaining on the photosensitive drum 10 is removed by a pre-exposure device 16 for a next latent image forming operation.

The four-color or full-color toner image formed on the intermediate transfer member 50 is secondarily transferred on a sheet P conveyed to a pressure contact nip portion (secondary transfer part) between a secondary transfer roller 14 and the backup roller 13 in a single operation. Similarly to the primary transfer roller, each of the secondary transfer roller 14 and the backup roller 13 is implemented by a conductive roller.

The secondary transfer roller 14 is disposed such that it can be brought into contact with and detached from the intermediate transfer member 50. The secondary transfer roller 14 is kept away from the intermediate transfer member 50 until a toner image formed by superimposing first to third color toner images has passed through the secondary transfer part, and is thereafter brought into pressure contact with the intermediate transfer member 50.

Then, secondary transfer voltage reverse in polarity to the charging polarity of the toner is applied to the secondary transfer roller 14 by the high-voltage power supply, not shown. As a consequence, the four-color toner image is secondarily transferred onto the sheet P from the intermediate transfer member 50 in a single operation.

The sheet P having the toner image transferred thereon is conveyed to a fixing device 30, where the toner image is subjected to fusion color mixing and is fixed on the sheet P. Thus, a full-color image is formed on the sheet P.

Toner remaining on the intermediate transfer member 50 without being transferred onto the sheet is moved along with rotation of the intermediate transfer member 50 to be removed by a cleaning blade 20 and collected in a toner collection container, not shown.

The cleaning blade 20 is disposed such that it can be brought into contact with and detached from the intermediate transfer member 50. The cleaning blade 20 is kept away from the intermediate transfer member 50 until the toner image formed by first to third color toner images has passed the blade position, and is thereafter brought into pressure contact with the intermediate transfer member 50 to clean the residual toner off the same.

In the image reading unit 200, an original 209 placed on an original platen glass 202 is fixedly held on the original platen glass 202 by a presser plate 206, and a scanner unit 207 moves in a direction indicated by an arrow, to optically read an image on the original 209.

In the scanner unit 207, an optical image reflected from the image on the original 209 illuminated by a halogen lamp (or a fluorescent lamp) 203 is formed by on a CCD 205 by a lens 204 and is converted into an electric luminance signal. The luminance signal is delivered to a reader image processor 208 and is converted to a digital signal by an A/D converter, not shown, to form an image data signal.

The image data signal is delivered to the CPU 101 of the printer section 201 to perform ON/OFF control of light emission of the laser light source 5. In addition to an operator placing an original directly on the original platen glass 202, there may be provided an automatic original feeder and discharger (not shown) so that original feeding can be performed automatically. More specifically, the original may be automatically fed onto the original platen glass 202 by the automatic original feeder and discharger and then subjected to image reading by the scanner unit 207, followed by being automatically discharged onto a discharge tray (not shown).

Next, the maintenance system for image forming apparatuses, according to the embodiment of the present invention, will be described with reference to FIGS. 2 to 14.

As shown in FIG. 2, in the maintenance system for image forming apparatuses, according to the present embodiment, a plurality of image forming apparatuses 1 are connected to the host computer (management apparatus) 300 via a network (communication line) 400. In the present embodiment, it is assumed that the image forming apparatuses 1 are installed at respective customer sites and the image forming apparatuses 1 are each managed by an individual responsible service person.

As shown in FIG. 3, in an image forming apparatus 1, image data sent to the printer section 201 from the reader image processor 208 is temporarily stored in a memory HDD 105. The image data is visually displayed as an image on a display device 102 by the CPU 101 as a controller. The display device 102 is implemented by a liquid crystal panel or a CRT and also plays the role of an operating panel having touch-operated keys provided in the display screen.

Job data indicative of job execution contents configured via the operating panel of the display device 102 are stored in a RAM 108. State data indicative of apparatus statuses detected by respective sensors 106 including a temperature and humidity sensor 24 (see FIG. 1) provided in the printer section 201, and the total number of used sheets counted by a sheet counter 107 are sequentially updated and stored in the RAM 108.

Supplementary information on the image data, the job data, and the state data is sent from a communication device (first transmission unit, second reception unit) 104 to the host computer 300 via the network 400, together with machine number data as individual identification information on the image forming apparatus 1.

The host computer 300 is comprised of a CPU 303, a communication device (first reception unit, second transmission unit) 301, and an HDD (storage unit) 302. The host computer 300 receives data from the image forming apparatuses 1 by the communication device 301 and stores the received data in the HDD 302 to accumulate the same for construction of a database.

Further, in response to a transmission request from an image forming apparatus 1, the host computer 300 sends data accumulated in the HDD 302 from the communication device 301 to the image forming apparatus 1 on the requesting side, via the network 400.

Next, processing carried out when an abnormal image has occurred in an arbitrary one of the image forming apparatuses 1 will be described with reference to FIGS. 6A to 6F.

When an abnormal image has occurred in an image forming apparatus 1, a service person A investigates the cause of the trouble and then carries out repairing work based on the result of the investigation. First, prior to the investigation, the service person A operates the image forming apparatus 1 to output an image sample of the abnormal image (data of the trouble) in an image pattern in which the features of the abnormality are easily perceivable.

For example, a sample of an entire halftone image with halftone density all over, a solid image with the maximum density all over, an image with a white background all over, or an image of vertical lines or horizontal lines alone is output. These image samples are output in monochrome or full color as required. In the case of color output, only a predetermined one of yellow, magenta, and cyan may be selected and output. Further, for example, the double-sided mode and conditions of a sheet used for printout are selected as conditions under which an abnormality is apt to occur, as deemed necessary. Usually, the sample is output under the same conditions as those of a job which produced an abnormality pointed out by a customer.

Then, image data and supplementary information on the abnormal image are transmitted by operating an operating screen of the display device 102 of the image forming apparatus 1.

Figure 6A:
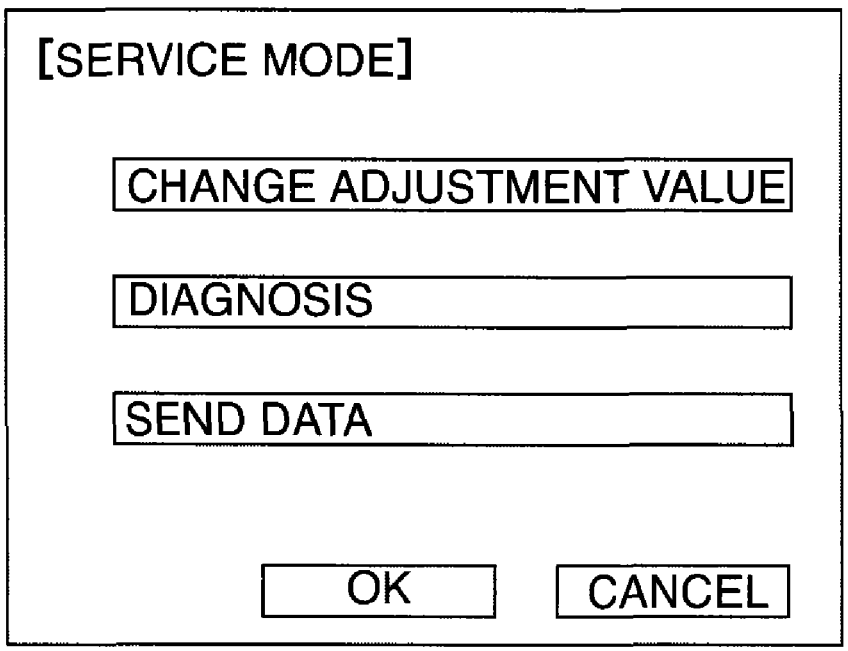
Figure 6B:
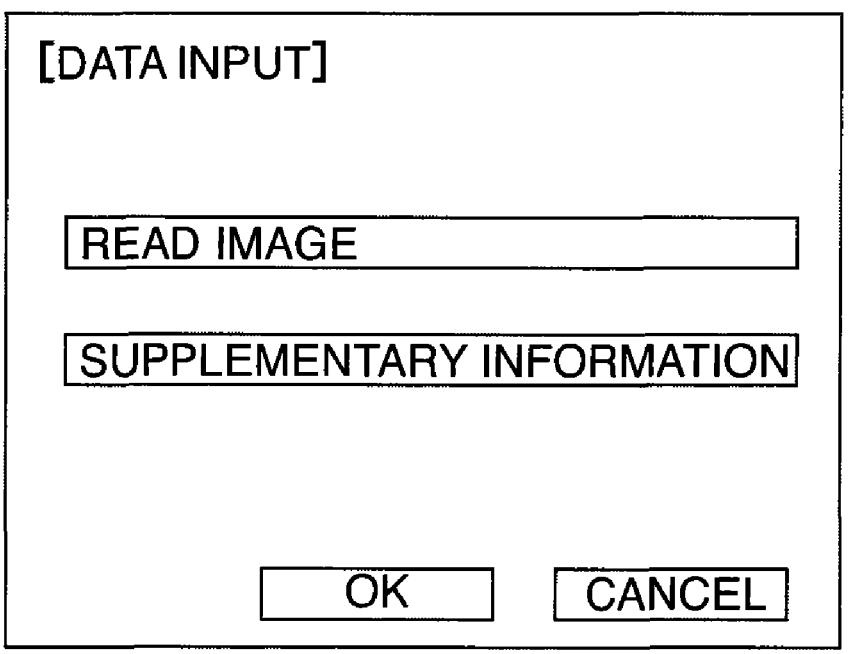

First, a predetermined menu screen is operated on the display device 102 to reach a service mode screen shown in FIG. 6A. Then, when an option "SEND DATA" is selected from the service mode screen on the display device 102 and an "OK" key is pressed, the screen is switched to a screen shown in FIG. 6B.

Next, when an option "READ IMAGE" is selected and an "OK" key is pressed, the screen is switched to a screen shown in FIG. 6C. Following an instruction displayed on the screen shown in FIG. 6C, the service person A places on the original platen glass 202 of the image forming apparatus 1 an unused white sheet (plain sheet), without any folds or stains, of the same type as that of a sheet on which the image sample was printed out.

Then, when an "OK" key is pressed, the white sheet is read in by the image reading unit 200, and the read-in image data is stored in the HDD 105, followed by the screen being switched to a screen shown in FIG. 6D.

Following an instruction displayed on the screen shown in FIG. 6D, the service person A places on the original platen glass 202 the image sample output from the image forming apparatus 1, and presses an "OK" key. Then, the image sample is read in by the image reading unit 200, and the read-in image data is stored in the HDD 105.

Then, the CPU 101 computes the difference between the read-in image data of the image sample and that of the white sheet, and the result of the computation is stored again in the HDD 105 as final data of the image sample of the abnormal image.

The computation of the difference between the read-in image data of the image sample and that of the white sheet is performed so as to prevent disturbance data due to a stain or dirt in the image reading unit 200 or the presser plate 206 from being added to the read-in image data of the image sample.

This makes it possible to obtain correct data of the image sample resulting from an abnormality of the printer section 201, if any.

Further, the CPU 101 calculates the average value of the read-in image data in the entire area on the white sheet and the maximum and minimum values of the same. Then, if the difference between the average value and the maximum value or the difference between the average value and the minimum value is larger than a preset predetermined value, the CPU 101 causes the display device 102 to display a message or the like indicating that an abnormality has occurred in the image reading system due to a stain or dirt or the like.

At a time point the image sample was output from the image forming apparatus 1, supplementary information has been temporarily stored in the RAM 108. When reading of the image sample and the white sheet by the image reading unit 200 is completed, the screen is switched back to the screen shown in FIG. 6B. Then, when an option "SUPPLEMENTARY INFORMATION" is selected and the "OK" key is pressed, the supplementary information is transferred to the HDD 105 and stored therein, followed by the screen being switched to a screen shown in FIG. 6E.

Figures 6E, 6F:
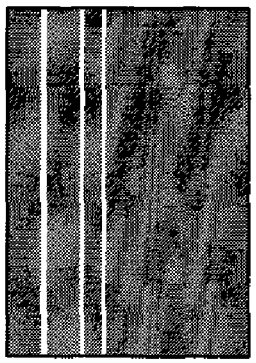

The screen shown in FIG. 6E is provided for checking data contents. The service person A checks the supplementary information and then inputs comments on the type of the abnormal image, detailed features of the abnormality, and so forth, by using operating keys (not shown) of the image forming apparatus 1. The type of an abnormal image is a simplified description of features of an abnormality of the image, and is selected from predetermined abnormality types.

A data set comprised of the image data and the supplementary information as a set is assigned a serial number "data****". When an "OK" key is pressed on the screen shown in FIG. 6E, the selected abnormality type and the input comments are stored in the HDD 105 and added to the data set.

Next, the service person A troubleshoots the image forming apparatus 1 that has output the abnormal image. In general, the power of the image forming apparatus 1 is kept off during repairing work. After completion of the repairing work, the power of the image forming apparatus 1 is turned on, and it is confirmed that trouble or inconvenience has been eliminated by the repairing work. Then, the predetermined menu screen is operated so as to display a data content confirmation screen, shown in FIG. 6F, on the display device 102. At this time point, an input screen for inputting a repairing method (maintenance information) is displayed on the display device 102, and the service person A inputs a repairing method by using the operating keys (not shown) of the image forming apparatus 1.

When a "SEND" key is pressed after the repairing method having been input, the repairing method is stored in the HDD 105 and added to the data set. The data set is sent from the communication device 104 to the host computer 300 via the network 400. The host computer 300 receives the data set from the image forming apparatus 1 via the communication device 301 and stores the data in the HDD 302 to accumulate the same for construction of the database.

Next, the supplementary information will be described with reference to FIG. 4.

As shown in FIG. 4, among supplementary information items, a machine number, a date, and state data are stored in the RAM 108 at a time point an image sample is output from an image forming apparatus 1. Job data is useful information including image sample output conditions, i.e. conditions under which an abnormality is apt to appear in an image. The outputs of the respective sensors 106 are each used as data indicative of a status of the image forming apparatus 1 at a time point when an abnormal image is formed. The type of an abnormal image, comments, and a repairing method are input by a service person, as mentioned hereinabove.

Further, as shown in FIGS. 5A and 5B, the abnormal images are assigned code numbers in advance on a type-by-type basis and the job data items are assigned code numbers on a content-by-content basis. These data items are managed by the code numbers.

A plurality of data sets are sent to the host computer 300 from the image forming apparatuses 1 in association with a plurality of types of abnormal images, as described above, whereby data of abnormal images and data of repairing methods are accumulated in the HDD 302 of the host computer 300 (see FIG. 14). These data items are managed by code numbers, respectively, so that data associated with desired conditions can be retrieved by a machine number or a code number. The CPU 303 within the host computer 300 functions as a controller for executing this data retrieval.

Next, a description will be given of the sensors 106.

In the image forming apparatuses 1, during warm-up rotation and post-rotation after image forming operation, state quantities representing the state of the apparatus are detected by the respective sensors 106, and various image stabilization control operations are carried out based on the results of the detection so as to always maintain image quality in a stable condition against environmental changes and deterioration of component parts due to long-term service.

For example, a change in electrostatic chargeability or photosensitivity of the photosensitive drum 10 due to long-term service or the stain or dirt on the corona charger 2 causes a change in latent image potential. Therefore, in order to obtain a desired latent image potential, the following method is employed: First, the surface potential of the photosensitive drum 10 is measured by a potential sensor 9 while applying a constant current to the corona charger 2. Then, the potential is measured while sequentially changing the current value of the constant current, to thereby investigate the correlation between the electric current and the potential, and a current value I from which a desired dark potential VD can be obtained is calculated based on the correlation. By applying the current value I during image forming operation, it is possible to always control the dark potential VD to a desired value.

Further, in order to obtain a desired light potential VL, the photosensitive drum 10 is charged to the dark potential VD based on the result of the above-described calculation, and the potential is measured in this state while sequentially changing the output of the laser light source 5, to thereby investigate the correlation between the laser output and the potential. Then, a laser output P from which the desired light potential VL can be obtained is calculated based on the correlation. By performing exposure by the laser output P during image forming operation, it is possible to always control the light potential VL to a desired value.

Further, in order to maintain image density of each color at a constant level, the following method is employed: First, a single-color patch image having a predetermined density is formed in a non-image area on the photosensitive drum 10. Then, the patch image is transferred onto the intermediate transfer member 50, and the density of the patch image is detected by a density sensor 8 disposed in facing relation to the intermediate transfer member 50. Thereafter, the excessive/insufficient amount of the toner is calculated based on the detected density, and if the amount of the toner is insufficient, a time period over which the toner is supplied to the associated developing device is increased to thereby control the density such that it is maintained at a constant level.

Furthermore, it is known that the resistance of a transfer roller increases due to long-term service involving voltage application particularly when the transfer roller formed of an ionic conductive material is used. For this reason, in order to maintain transfer efficiency at a constant level, a target current It is applied as a constant current to the transfer roller for the non-image area, and a voltage Vt obtained at this time is detected, and then the constant voltage Vt is applied during transfer of a toner image. This causes the transfer current It to be always applied to a toner image portion irrespective of changes in the resistance of the transfer roller, whereby transfer efficiency is maintained at a constant level. This control is provided for primary transfer (primary transfer charger (roller) 4) and secondary transfer (secondary transfer roller 14), whereby primary transfer voltage and secondary transfer voltage are determined.

Further, the temperature and humidity sensor 24 is provided in the image forming apparatus 1, and the amount of moisture is calculated based on temperature and humidity detected by the temperature and humidity sensor 24. The result of the calculation of the amount of moisture is used to correct the target value of the latent image potential and that of the transfer current. This is because the performance of an electrophotographic image forming apparatus is easily affected by the amount of moisture in an ambient atmosphere, and hence it is required to maintain the optimum performance of the apparatus according to the amount of moisture.

Each of the developing devices 3y, 3m, and 3c is filled with the two-component developer comprising toner and carrier particles. The weight ratio of the amount of toner to the total amount of developer composed of the toner and carrier particles is referred to as toner density. The quality of development changes depending on the toner density. As printing operation is continuously performed, toner is progressively consumed, and the toner density becomes lower. When the toner density becomes lower than a predetermined lower limit value, the amount of carrier particles deposited on the photosensitive drum 10 in a developing process increases, which causes a trouble that the carrier particles scratch the cleaning device 6 and the intermediate transfer member 50.

On the other hand, when toner is excessively supplied to a developing device e.g. due to failure of a toner replenishing device, the toner density rises, and if the toner density exceeds an upper limit value, the amount of toner that adheres to a white image background increases, which causes a fogging phenomenon or a trouble that an increased amount toner is scattered from the developing device to stain or soil the inside of the apparatus. To prevent these, there is provided a toner density sensor 7 for monitoring the toner density.

The toner density sensor 7 is implemented by a photosensor. As shown in FIG. 1, the toner density sensor 7 is disposed at a location opposed to a retracted position of the developing devices 3y, 3m, and 3c, to measure the toner density of developer on a developing roller, not shown, which carries the developer thereon. An output from the toner density sensor 7 is converted to a digital signal to be used as state data indicative of the state of developer.

Next, processing executed when an abnormality occurs in an image forming apparatus 1 installed at the site of a customer of a service person B will be described with reference to FIGS. 7A to 7F.

When an abnormal image occurs in the image forming apparatus 1, the service person B receives data from the host computer 300 so as to obtain information required for repairing work. First, when an option "DIAGNOSIS" is selected and pressed on a service mode screen (the same screen as shown in FIG. 6A), shown in FIG. 7A, of the display device 102, the screen is switched to a diagnosis-mode selection screen shown in FIG. 7B. In this step of the present procedure, an option "IMAGE" is selected and pressed on the screen, shown in FIG. 7B, so as to carry out image diagnosis, so that the screen is switched to an image diagnosis screen shown in FIG. 7C.

Figure 7C:
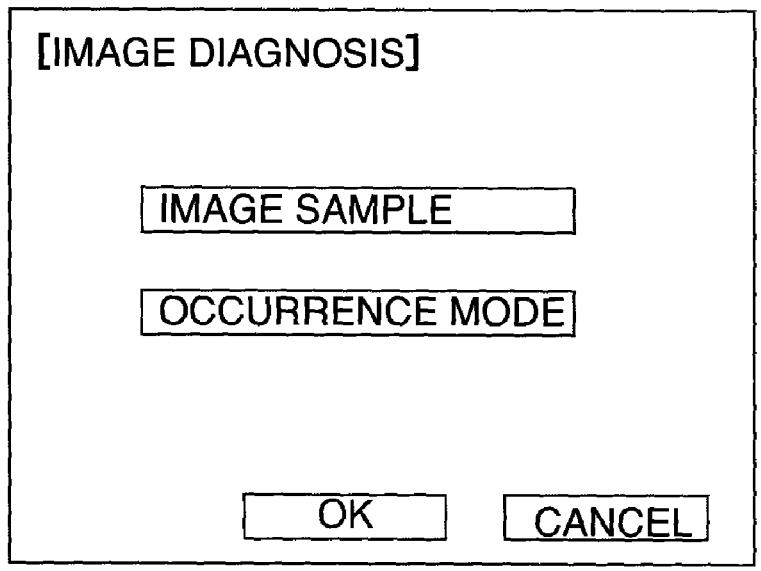

On the screen shown in FIG. 7C, a selection is made between a search option of "IMAGE SAMPLE" and a search option of "OCCURRENCE MODE". If the search option "IMAGE SAMPLE" is selected and depressed on the screen shown in FIG. 7C, the screen is switched to an image sample retrieval screen shown in FIG. 7D, whereas if the option "OCCURRENCE MODE" is selected and depressed, the screen is switched to an occurrence mode retrieval screen shown in FIG. 7E.

Figure 7D:
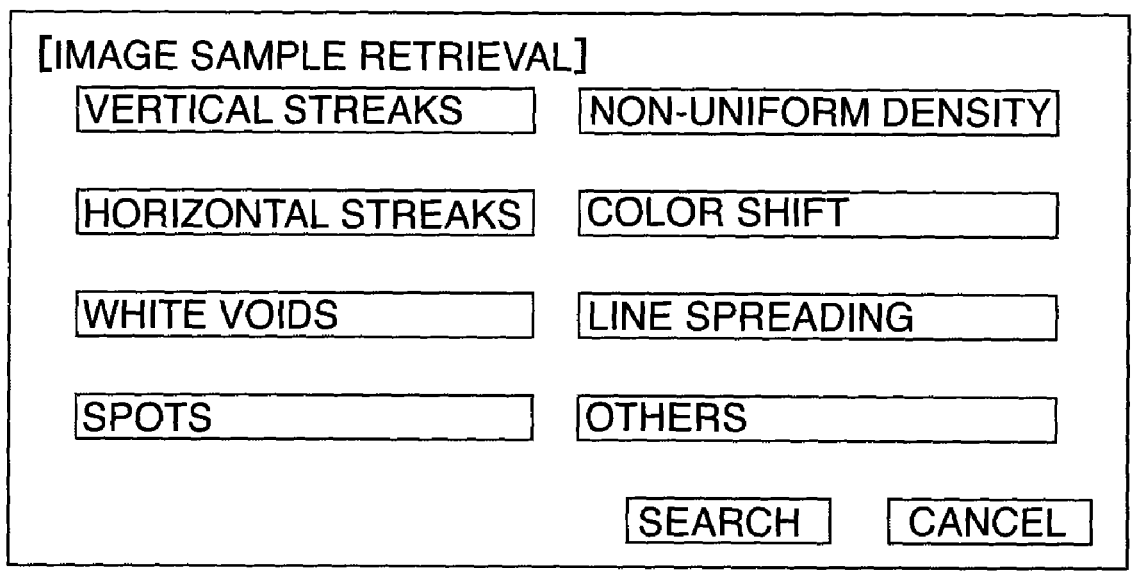

On the image sample retrieval screen shown in FIG. 7D, a plurality of abnormal image types are displayed, so that a type having a similarity with the abnormality of the abnormal image output from the image forming apparatus 1 to be repaired is selected from the group.

For example, when an option "VERTICAL STREAKS" is selected on the image sample retrieval screen shown in FIG. 7D and then a "SEARCH" key is pressed, a transmission request for transmission of data concerning the abnormality of vertical streaks is sent from the communication device 104 to the host computer 300 via the network 400.

When the communication device 301 of the host computer 300 receives the transmission request from the image forming apparatus 1, the CPU 303 retrieves a data set having the code number of vertical streaks from data sets accumulated in the HDD 302. The retrieved data set is sent from the communication device 301 to the image forming apparatus 1 via the network 400.

Figures 7E, 7F:
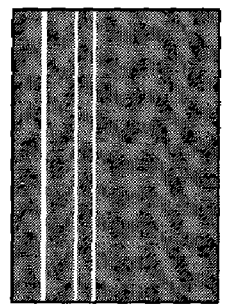

When the communication device 104 of the image forming apparatus 1 receives the data set sent from the host computer 300, the image forming apparatus 1 stores the data set in the HDD 105 via the CPU 101 and then displays a search result screen shown in FIG. 7F on the display device 102.

Displayed on the search result screen shown in FIG. 7F are a sample image with vertical streaks, and respective links to supplementary information, a comment box, and a repairing method. If it is desired to view a sample image with another type of vertical streaks on the screen shown in FIG. 7F, a "NEXT SAMPLE" key is selected and pressed. Then, a next data set of a sample image containing vertical streaks having the same code number is retrieved from the HDD 302 in the host computer 300 as in the same way as described above. The retrieved data set is sent to the image forming apparatus 1 as in the same way as described above, and the next sample image with vertical streaks is displayed on the search result screen of the display device 102 together with respective links to a supplementary information, a comment box, and a repairing method.

On the other hand, if a "PREVIOUS SAMPLE" key is selected and pressed on the search result screen shown in FIG. 7F, the immediately preceding image with vertical streaks stored in the HDD 105 of the image forming apparatus 1 is displayed, while if a "RETURN" key is selected and pressed, the screen is switched back to the screen shown in FIG. 7D.

Thus, the service person B retrieves a desired sample image and performs maintenance of the image forming apparatus 1 by referring to a repairing method attached to the sample image (shown by a link in the above-described display screen) most similar to the abnormal image output from the image forming apparatus 1.

If the option "OCCURRENCE MODE" is selected and pressed on the screen shown in FIG. 7C, the screen is switched to the occurrence mode retrieval screen shown in FIG. 7E. On the screen shown in FIG. 7E, conditions (monochrome/color, single-sided/double-sided, sheet type, and sheet size in the present embodiment) under which the abnormal image was formed are input by operating the operating keys.

Then, when a "SEARCH" key is selected and pressed, a transmission request for transmission of data associated with the input conditions is sent from the communication device 104 to the host computer 300 via the network 400.

When the communication device 301 of the host computer 300 receives the transmission request from the image forming apparatus 1, the CPU 303 retrieves a data set satisfying the input conditions from data sets accumulated in the HDD 302, based on job data code numbers. The retrieved data set is sent from the communication device 301 to the image forming apparatus 1 via the network 400.

When the communication device 104 of the image forming apparatus 1 receives the data set sent from the host computer 300, the image forming apparatus 1 stores the data sets in the HDD 105 via the CPU 101 and then displays a screen having the same form as that of the search result screen shown in FIG. 7F on the display device 102.

Then, the service person B compares between the sample image displayed on the screen of the display device 102 and the abnormal image output by the image forming apparatus 1 to be repaired. If the two images have a similarity therebetween, the service person B carries out maintenance of the image forming apparatus 1 by referring to a repairing method attached to the sample image (shown by a link in the above-described display screen). If the two images do not have a similarity, it is possible to retrieve optimum data by repeatedly selecting and pressing the "NEXT SAMPLE" key on the search result screen in the same way as described above until the optimum data is displayed.

Figure 8A:
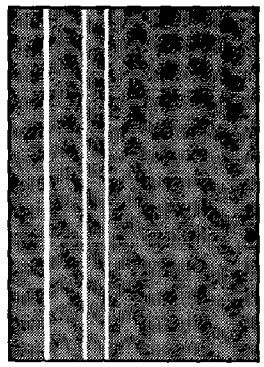
FIGS. 8A to 8C are views each showing an example of an abnormal image containing vertical streaks.
Figure 13A:
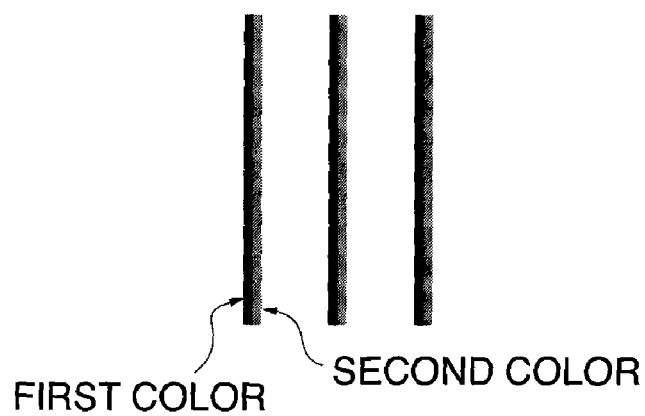
FIG. 13A is a view showing an example of an abnormal image with color shifts.
Figure 13B:
FIG. 13B is a view showing an example of an abnormal image with vertical color spreading.
Figure 14:
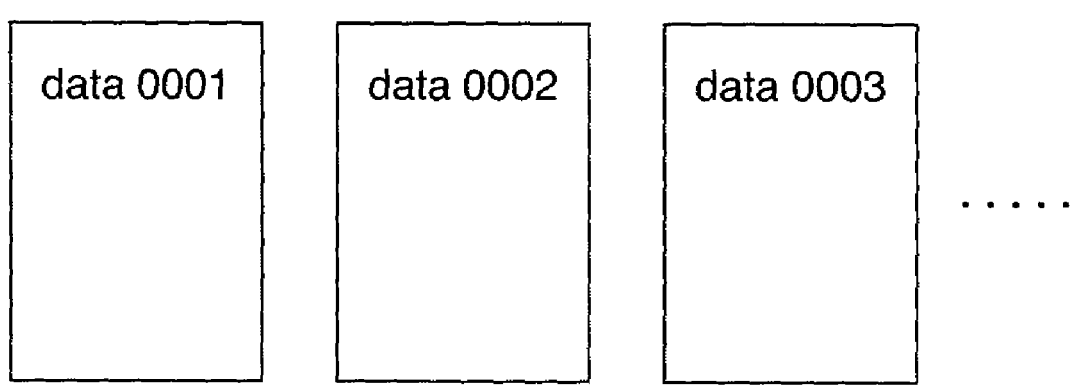
FIG. 14 is a conceptual view of storage data.

FIGS. 8A to 13B exemplify abnormal images, respectively. FIGS. 8A to 8C are views each showing an example of an abnormal image containing vertical streaks. FIGS. 9A to 9C are views each showing an example of an abnormal image containing horizontal streaks. FIGS. 10A to 11C are views each showing an example of an abnormal image containing white voids. FIGS. 11A and 11B are views each showing an example of an abnormal image containing spots. FIGS. 12A and 12B are views each showing an example of an abnormal image with a non-uniform density. FIG. 13A is a view showing an example of an abnormal image with color shifts. FIG. 13B is a view showing an example of an abnormal image with vertical color spreading.

Figure 8B:
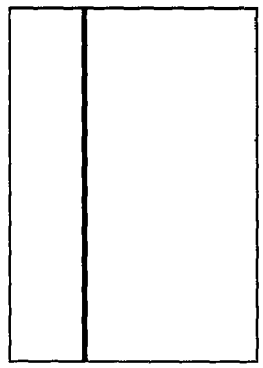
Figure 8C:
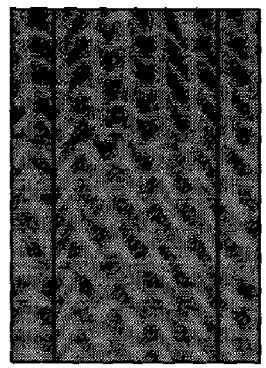

For example, sample images categorized into the abnormal image containing vertical streaks include a plurality of patterns, shown in FIGS. 8A to 8C, which are different in the color, width, or position of a vertical streak. The service person B refers to the sample images of these patterns to thereby retrieve a sample image determined by comparison to be most similar to an abnormal image output by the image forming apparatus 1 to be repaired.

As shown in FIGS. 8A to 13B, each of the other types into which other abnormal images are categorized also includes a plurality of patterns. If the service person A refers to the sample images before transmission of data of an abnormal image output from the image forming apparatus 1 to the host computer 300, and finds that a sample image similar to the abnormal image has already been stored in the host computer 300, it is not required to send the abnormal image data to the host computer 300.

Figure 9A:
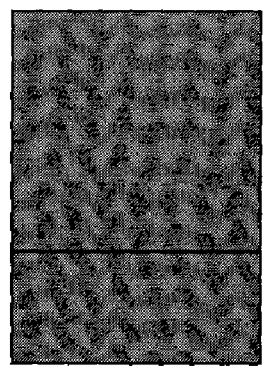
FIGS. 9A to 9C are views each showing an example of an abnormal image containing horizontal streaks.
Figure 9B:
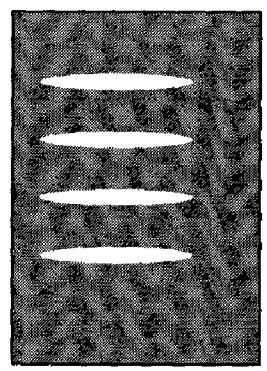
Figure 9C:
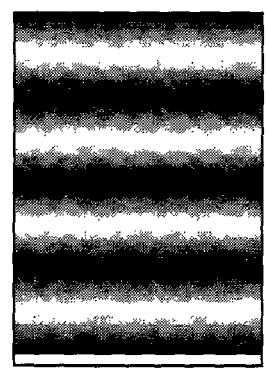
Figure 10A:
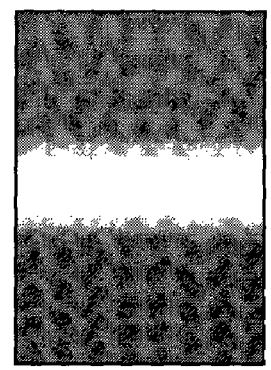
FIGS. 10A to 10C are views each showing an example of an abnormal image containing white voids.
Figure 10B:
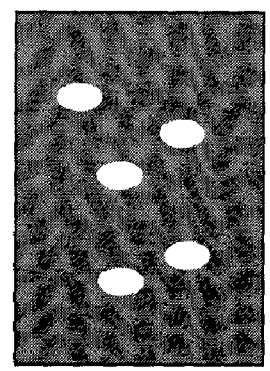
Figure 10C:
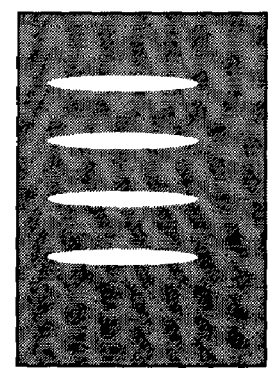
Figure 11A:
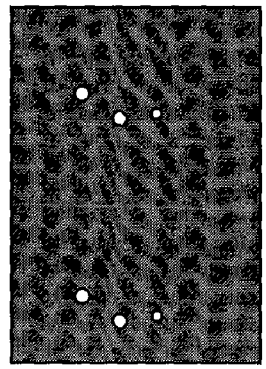
FIGS. 11A and 11B are views each showing an example of an abnormal image containing spots.
Figure 11B:
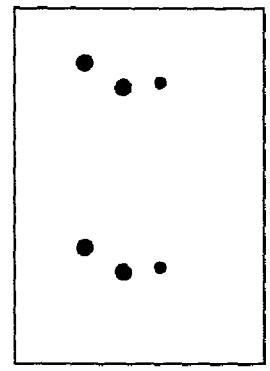
Figure 12A:
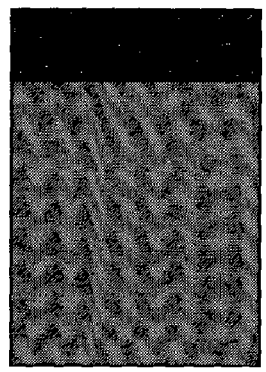
FIGS. 12A and 12B are views each showing an example of an abnormal image with a non-uniform density.
Figure 12B:
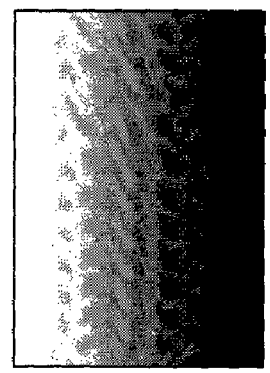

Further, for example, a sample image shown in FIG. 9B can be categorized into the abnormal image containing horizontal streaks and at the same time corresponds to an abnormal image containing white voids shown in FIG. 10C. Therefore, the service person A sends the abnormal image data as data of an abnormal image containing horizontal streaks to the host computer 300, and immediately thereafter sends the same data as data of an abnormal image containing white voids. This enables, when such an abnormal image as shown in FIG. 9B has occurred, the service person B to retrieve a sample image similar to the abnormal image, even by searching only sample images with white voids.

As described above, according to the present embodiment, when an abnormal image occurs in an image forming apparatus 1, the image forming apparatus 1 receives a similar one of abnormal images formed in a plurality of image forming apparatuses 1 and an associated piece of supplementary information including a repairing method, which are accumulated in the host computer 300, and displays the retried abnormal image and associated supplementary information including the repairing method on the display device 102. Therefore, even when an exceptional abnormal image occurs in an image forming apparatus 1, a service person can obtain appropriate maintenance information at a customer site by referring to the contents displayed on the display device 102.

This makes it unnecessary for each individual service person to individually investigate the cause of a trouble and grope for a repairing method, which makes it possible to shorten maintenance time and reduce maintenance costs.

It should be noted that the present invention is not limited to the above-described embodiment, but it can be practiced in various forms, without departing from the spirit and scope thereof.

Although in the above-described embodiment, data received from the host computer 300 is displayed on the display device 102 of an image forming apparatus 1, this is not limitative. For example, a service person may connect a small potable computer with a display device to the image forming apparatus 1 such that data can be transferred from image forming apparatus 1 to the small computer and displayed on the display device of the small computer.

Further, although in the above-described embodiment, the image forming apparatuses 1 of the same model are connected to the host computer 300 via the network 400, image forming apparatuses of other models may be connected to the network 400. In this case, it is possible to receive data from the image forming apparatuses of different models and utilize the received data as references for maintenance.

Furthermore, although in the above-described embodiment, the maintenance system is described by way of example which is used for troubleshooting an abnormal image as a trouble, this is not limitative. The present invention can be applied to other troubles than an abnormal image, such as forcible stoppage (error) caused by a self-diagnostic function incorporated in an image forming apparatus, or paper jam.

Further, as shown in FIGS. 2 and 3, a computer 500 of a service base may be connected to the host computer 300 via a network 401 such that the abnormal image data and the supplementary information described above can be received by the computer 500. In this case, a display device 501 may be connected to the computer 500 to display received data, or a printer 502 may be connected to the computer 500 so that image samples of an abnormal image and a supplementary information list can be output from the printer 502 for confirmation.

What is more, there may be provided a use mode of the system, in which when a customer notifies a trouble, he himself sends data of an abnormal image to the host computer 300 from his image forming apparatus 1, and a service person checks the transmitted data on the service base. In this case, the service person can grasp a repairing method in advance by retrieving a sample image similar to the abnormal image and then visit the customer, and hence, it becomes unnecessary for the service person to retrieve the sample image at the customer site, which enhances maintenance efficiency.

While the present invention has been described with reference to an exemplary embodiment, it is to be understood that the invention is not limited to the disclosed exemplary embodiment. The scope of the following claims is to be accorded the broadest interpretation so as to encompass all modifications, equivalent structures and functions.

This application claims priority from Japanese Patent Application No. 2006-238934 filed Sep. 4, 2006, which is hereby incorporated by reference herein in its entirety.

What is claimed is:

1. A maintenance system comprising:
    a plurality of image forming apparatuses each of which forms an image on a sheet;
    a management apparatus connected to each of the image forming apparatuses via a communication line;
    a first transmission unit arranged in each of the image forming apparatuses, configured to transmit data of a trouble in the respective image forming apparatus together with supplementary information including maintenance information;
    a first reception unit arranged in the management apparatus, configured to receive the data of the trouble and the supplementary information transmitted by one or more of said first transmission units;
    a storage unit arranged in the management apparatus, configured to store the data of the trouble and the supplementary information received by said first reception unit;
    a second transmission unit arranged in the management apparatus, configured to transmit the data of the trouble and the supplementary information stored in said storage unit, when a transmission request is received;
    a second reception unit arranged in each of the image forming apparatuses, configured to receive the data of the trouble and the supplementary information transmitted by said second transmission unit when the respective image forming apparatus outputs an abnormal image; and
    a display unit arranged in each of the image forming apparatuses, configured to display the data of the trouble and the supplementary information received by said second reception unit,
    wherein said supplementary information transmitted by said second transmission unit, received by said second reception unit and displayed by said display unit, contains a method of repairing the respective image forming apparatus to correct the abnormal image output by the respective image forming apparatus,
    wherein the maintenance system further comprises an image reading unit configured to read images,
    wherein the data of the trouble contains trouble image data generated based on image data formed by said image reading unit by reading the abnormal image on a sheet output from one of the image forming apparatus, and
    wherein a difference between the image data formed by said image reading unit by reading the abnormal image on the sheet output from the respective image forming apparatus and image data formed by said image reading unit by reading a plain sheet identical in type to the sheet output from the respective image forming apparatus is calculated as final data of the trouble image data, and said first transmission unit transmits the final data together with the supplementary information including the maintenance information.

2. A maintenance system as claimed in claim 1, wherein an image forming apparatus that outputs the abnormal image transmits the transmission request for transmitting the data of the trouble and the supplementary information stored in said storage unit, to said management apparatus via said first transmission unit.

3. A maintenance system as claimed in claim 1, wherein the management apparatus includes a display unit.

4. A maintenance system as claimed in claim 1, wherein each of the image forming apparatuses includes said image reading unit.

5. A maintenance system as claimed in claim 1, wherein said display unit displays an input screen for inputting the maintenance information to be transmitted by said first transmission unit.

6. A maintenance system as claimed in claim 1, wherein said display unit displays a retrieval screen for retrieving required data of a trouble and supplementary information associated therewith from a plurality of data items of troubles and associated supplementary information received by said second reception unit.

7. A maintenance system as claimed in claim 1, wherein the maintenance information includes an abnormal image type.

8. A maintenance system as claimed in claim 1, wherein the maintenance information includes job data used when the abnormal image was output by the image forming apparatus.

9. A maintenance system as claimed in claim 1, wherein the maintenance information includes information on a state in which the respective image forming apparatus was in when the respective image forming apparatus output an abnormal image.

10. A maintenance system as claimed in claim 1, wherein the image forming apparatuses are of an identical model.

* * * * *